United States Patent Office 2,932,576
Patented Apr. 12, 1960

2,932,576

MOLD COATING COMPOSITION

Ernest R. Vierk, Lansing, and Charles A. Mazzoni, Jr., Harvey, Ill., assignors to Sinclair Refining Company, New York, N.Y., a corporation of Maine No Drawing. Application December 27, 1957
Serial No. 705,510

4 Claims. (Cl. 106—38.22)

The present invention relates to an emulsifiable oil composition finding particular utility as a mold release agent. More specifically the present invention resides in an improved emulsifiable oil composition having suspended therein colloidal graphite, said composition providing a superior glass mold lubricant when emulsified with water.

The manufacture of glass ware articles such as glasses, bottles, jars, etc. has developed into an extensive art with a great variety of machines and processes for forming the different articles. While the details of such machines and processes may vary to a great extent, the overall process and apparatus may be represented by the following description of a typical glass molding operation for making bottles. The ingredients of the glass, i.e., silica, etc. can be automatically charged into a furnace wherein they are heated to a temperature of about 2600 to 2800° F. to form the molten glass. The thus formed molten glass is forced through openings in the funace and cut into desired sizes or "gobs" by lubricated shears. The glass gobs are delivered through lubricated troughs to a split cast iron mold known as the blank mold. In this preliminary blank mold the neck of the bottle is formed by a partial air blow. The split mold then opens and a mechanical arm picks up the partially formed bottle, inverts it and delivers it to another split mold known as the finishing or air blow mold. Here under a pressure of about 40 p.s.i. the final air blow forms the bottle. The finished bottle is then placed on a conveyor which carries it to the lehr where it is annealed. The bottle upon leaving the lehr is given a final inspection and then boxed for shipment.

In order to facilitate the ready removability of the partially formed and completely formed bottle from the split molds, the molds must be sprayed or swabbed with a lubricant before each injection of a glass gob. Generally a lubricant to be useful at this point in the manufacture of glass articles should have embodied therein the following characteristics: (1) effective deposit of the release agent, e.g. graphite, vermiculite, mica, etc., (2) reduction or elimination of smoke and fire hazards usually occasioned by the vaporization of one or more components of the lubricant on contact with the hot mold, (3) minimum buildup of ash in the molds which might tend to produce dimensional changes in the glass article or deface the glass surface resulting in a large number of rejects, and (4) complete dispersion of the release agent in the mold lubricant so that uniform lubrication of the mold surfaces can be attained. Generally, the lubricant compositions in commercial use today, which are comprised of a major part of a mineral oil base having suspended therein a solid lubricant such as graphite, have serious shortcomings with respect to one or more of the desired characteristics, particularly in regard to the formation of dense clouds of smoke occasioned by the vaporization of the lubricating base oil resulting in the formation of oily layers on the machine and superstructure with the accompanying hazards of fire.

In accordance with the present invention we have produced an emulsifiable oil composition which upon emulsification with water will yield a superior glass mold lubricant embodying all of the above desirable features and being particularly characterized by a notable reduction in smoke and oily vapors upon contact with the hot molds. The emulsifiabte oil composition of the present invention comprises as its major constitutent a petroleum oil and about 1 to 40 percent, preferably about 5 to 15 percent, by weight of a colloidal deflocculated graphite electrically suspended in a petroleum oil, about 1 to 15 percent, preferably about 10 to 15 percent, by weight of a non-ionic surface active polyoxyethylene derivative of hexitol anhydride partial long chain fatty acid ester, about 0.1 to 2 percent by weight of an non-ionic surface active long chain fatty acid partial ester of hexitol anhydride and about 0.1 to 5 percent by weight of a non-ionic surface active fatty acid ester of a polyhydric alcohol. The base oil is substantially the balance of the composition.

The composition of the present invention is readily prepared by dispersing the componets in the petroleum base oil. Advantageously a slightly elevated temperature, e.g. about 100 to 175° F., can be employed to enhance uniformity of the mixture. In order to obtain the desired degree of homogeneity and uniformity it is advantageous to blend the ingredients in the following sequence of steps. The base oil is elevated to the desired temperature, i.e. 150° F. and the graphite suspension is mixed therewith. After thorough mixing the emulsifiers are added and the entire mixture blended as by passing through a homogenizer. Alternatively, all ingredients could be mixed at room temperature and then the temperature of the mixture elevated to effect the blending.

In use as a mold release agent as described above the composition of the present invention can be dispersed in about 1 to 100 parts of water depending upon the particular application for which it is intended. We have found, however, that advantageous results can be obtained in most glass molding processes when using a ratio of about 1 part of the oil composition to about 10 to 40 parts of water, and preferably the ratio should be about 1 to 20.

The petroleum base oil for use in my emulsifiable oil composition can be any mineral oil of lubricating viscosity. Preferably the base oil is a neutral or distillate oil and will have a viscosity of about 50 to 1200 SUS at 100° F. It can be highly refined such as white oil or lightly refined as by distillation, solvent extraction or clay or chemical treatment. Tests indicate that the lower the vapor pressure of the base oil within the neutral oil range the greater the graphite deposit. However, it was further noted in conjunction with this that the lower the vapor pressure and greater the viscosity that the more difficult the oil was to emulsify. In arriving at a satisfactory base oil for use in the present composition both of these points must be kept in mind and a compromise reached therebetween. We have found that the preferred base oil is one derived from an acid-refined naphthenic neutral and having a viscosity of about 100 SUS at 100° F., hereinafter referred to as oil A.

Since non-colloidal graphite tends to separate from the emulsifiable oil or the emulsion upon storage it is advantageous to use graphite colloidally suspended in a carrying medium. Moreover, due to the scouring effect of steam on the deposited graphite at the elevated temperatures, e.g. 700° F., it is desirable that the graphite be suspended in an oil-based carrier rather than a water-based carrier. Furthermore, it was learned that even some oil-based carriers are not as effective as others in providing for the deposition of the solid lubricant. In order to determine the most satisfactory graphite suspension for the present composition the following tests were conducted. Steel panels measuring 2" x 1¼" x 3/32" were used as a test specimen. Before the test the steel panels were sanded and then cleaned with a solvent. After cleaning the panels were heated on a hot plate for approximately 3 to 5 minutes to a temperature of about 600 to 800° F. The temperature of the panel was measured by employing a chrome-alumel thermocouple welded to the surface of a test panel. After the panel was heated it was sprayed with the formulation to be tested by use of a paint spray gun adjusted to deliver about 15 p.s.i. of pressure. After spraying the panel was allowed to cool and finally a portion of the specimen was wiped in order to observe the graphite deposited. The tests were conducted on compositions as identified in the table below wherein the results are also reported. The oil blends were emulsified in about 20 parts of water and then tested in the above-indicated manner.

TABLE I

| Oil Composition | Wt. Percent | Results of Test at 700° F. |
|---|---|---|
| Base Oil A | Balance | |
| Tween 85 | 12.6 | |
| Span 20 | 0.4 | |
| Polyethylene Glycol 400 Mono-oleate | 2.0 | |
| Blend: | | |
| (a) Acheson Colloid No. 51 | | Very light deposition. |
| (b) Acheson Colloid Castordag | | Do. |
| (c) Acheson Colloid Aquadag | | Do. |
| (d) Acheson Colloid Oildag | | Light deposition. |

In blends a to d the type of graphite varied and the graphite concentrate in each of the blends was adjusted to yield a 2.0 percent graphite concentration in the finished blend with the remainder being the base oil. In each of the above graphite compositions a to d, the solid graphite particles were electrically suspended in the carrying medium. The individual graphite compositions are identified as follows:

| Blend | Solids Content, percent | Carrying Medium |
|---|---|---|
| a | 10 | Petroleum Bright Stock. |
| b | 10 | Castor Oil. |
| c | 22 | Water. |
| d | 10 | Neutral Petroleum Lubricating Oil. |

Thus, it can be seen that the most advantageous graphite suspension for the present purpose is the type of petroleum oil suspension known as "Oildag." This material is a suspension of about 10 percent graphite in a neutral petroleum oil carrier of lubricating viscosity, the graphite particles being electrically suspended in the oil carrier by like charges on each graphite particle. The graphite suspension will generally comprise about 1 to 40 percent of our emulsifiable composition and the suspension may contain about 5 to 40 percent of graphite. Preferably, the suspension will be present in amounts of about 20 percent by weight of the composition.

A commercially available material which is a polyoxyalkylene derivative of hexitol anhydride partial long chain fatty acid ester and which can be used in the present invention is marketed as "Tween 85," a product of the Atlas Powder Company. "Tween 85" is the reaction product of about 5 mols of ethylene oxide and one mol of sorbitan trioleate and is an oily liquid at 25° C. having a flash point of about 565° F., a fire point of about 645° F. and a specific gravity of about 1.00 to 1.05. Such reaction products containing from about 2 to 25 mols or more of ethylene oxide per mol of the ester are especially preferred.

"Span 20" is a commercially available (Atlas Powder Company) example of the long chain fatty acid partial ester of hexitol anhydrides which can be used in our invention and comprises essentially sorbitan monolaurate. "Span 20" is an oily liquid having a flash point of about 400° F., a fire point of about 440° F. and a specific gravity of about 1.00 to 1.06. The long chain fatty acids which are employed in producing both the fatty acid partial esters of hexitol anhydrides and their polyalkylene derivatives contain about 12 to 24 carbon atoms per molecule. The acids can be saturated or unsaturated and include, for example, lauric, palmitic, stearic and oleic acids. By "hexitol anhydride" is meant inner esters having one cyclic oxygen per ring derived from hexahydric alcohol by intermolecular condensation and includes the mono-, anhydro- and dianhydro derivatives, i.e. hexides, hexitans, mannides, mannitans, and the like. By "partial ester" is meant that the hydroxy groups of the anhydride are not all esterified; mono-, di-, and tri-esters and mixtures thereof are preferred and these can be simple or mixed esters.

The on-ionic surface active fatty acid esters of the polyhydric alcohol can advantageously be a polyethylene glycol mono-oleate having a molecular weight of about 400 although similar materials of higher or lower molecular weight can be used if desired. They can be prepared by treating the fatty acids with ethylene oxide or by esterifying the appropriate glycols. The fatty acid portion of the ester should normally be one having about 12 to 18 carbon atoms in its molecule, and generally the polyethylene glycol ester has a molecular weight of about 200 to 600.

The following specific examples will serve to illustrate our preferred emulsifiable oil composition and the results obtainable by using our present composition as a glass mold lubricant.

*Example I*

The emulsifiable oil was prepared by adding 20.0 percent by weight Oildag, 12.6 percent by weight Tween 85, 0.4 percent by weight Span 20, and 2.0 percent by weight of polyethylene glycol 400 mono-oleate to an acid-refined naphthenic neutral oil having a viscosity of 100 SUS at 100° F. The ingredients were mixed together at room temperature and then the temperature was raised to about 150° F. with continuous mixing until complete dispersion had been effected. The physical and chemical properties on the formulation were as follows:

| | |
|---|---|
| Gravity, ° API | 19.1 |
| Flash, ° F. | 360 |
| Fire, ° F. | 385 |
| Viscosity, SUS at 100° F. | 234.8 |
| Viscosity, SUS at 210° F. | 47.38 |
| Carbon residue, percent | 2.83 |
| Saponification number | 14.6 |

*Example II*

A suitable emulsion for lubricating glass molds can be prepared by homogenizing about 1 part of the oil composition of Example I with about 20 parts of water. An emulsion is formed which is relatively stable in water up to about 400 p.p.m. hardness at room temperature. This emulsion also results in a composition having the graphite uniformly suspended therethrough and good graphite depositing characteristics.

An emulsion substantially as described in Example II was tested as a glass mold lubricant on a Hartford Empire IS machine producing 12 oz. beer bottles at the rate of approximately 47 per minute. The lubricant was introduced into the machine molds by a bent copper tube located 6 to 8 inches above the mold. The lubricant collects in the tubing and at intervals of about every 10 to 12 seconds a charge of air is blown into the tubing, thus spraying the interior of the molds with the lubricant. The emulsion was used in the above machine for more than five days with production rate and number of rejections being about normal. An immediate substantial reduction in smoke and oily vapor formation was noticed when our improved lubricant composition was introduced into the molds.

We claim:
1. An emulsifiable oil composition consisting essentially of about 1 to 40 percent by weight of graphite electrically suspended in a neutral petroleum oil, about 1 to 15 percent by weight of a non-ionic surface active polyoxyalkylene derivative of hexitol anhydride partial long chain fatty acid ester containing about 2 to 25 mols of ethylene oxide per mol of ester, about 0.1 to 2 percent by weight of a non-ionic surface active long chain fatty acid partial ester of hexitol anhydride, about 0.1 to 5 percent by weight of a non-ionic surface active fatty acid ester of polyethylene glycol wherein the fatty acid portion of each of said esters contains about 12 to 18 carbon atoms per molecule, with substantially the remainder being a petroleum oil of lubricating viscosity.

2. An emulsifiable oil composition as in claim 1 wherein the petroleum oil base has a viscosity of about 50 to 1200 SUS at 100° F.

3. An oil-in-water emulsion consisting essentially of about 1 to 100 parts of water and 1 part of the composition of claim 1.

4. An oil-in-water emulsion consisting essentially of about 1 to 100 parts of water and 1 part of the composition of claim 2.

References Cited in the file of this patent

UNITED STATES PATENTS

| | | |
|---|---|---|
| 1,524,872 | McLeod | Feb. 3, 1925 |
| 2,549,535 | Skooglund | Apr. 17, 1951 |
| 2,563,499 | Smith | Aug. 7, 1951 |
| 2,784,108 | Cupper | Mar. 5, 1957 |
| 2,846,323 | Oppliger | Aug. 5, 1958 |

OTHER REFERENCES

Atlas Publication, "Surface Active Agents," pub. 1948 by Atlas Powder Co., Wilmington, Delaware (p. 38).